(12) United States Patent
Wang et al.

(10) Patent No.: US 10,424,052 B2
(45) Date of Patent: Sep. 24, 2019

(54) IMAGE REPRESENTATION METHOD AND PROCESSING DEVICE BASED ON LOCAL PCA WHITENING

(71) Applicant: Peking University Shenzhen Graduate School, Shenzhen (CN)

(72) Inventors: Wenmin Wang, Shenzhen (CN); Mingmin Zhen, Shenzhen (CN); Ronggang Wang, Shenzhen (CN); Ge Li, Shenzhen (CN); Shengfu Dong, Shenzhen (CN); Zhenyu Wang, Shenzhen (CN); Ying Li, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 27 days.

(21) Appl. No.: 15/756,193

(22) PCT Filed: Sep. 15, 2015

(86) PCT No.: PCT/CN2015/089576
§ 371 (c)(1),
(2) Date: Feb. 28, 2018

(87) PCT Pub. No.: WO2017/045113
PCT Pub. Date: Mar. 23, 2017

(65) Prior Publication Data
US 2018/0240217 A1     Aug. 23, 2018

(51) Int. Cl.
*G06K 9/46* (2006.01)
*G06T 5/00* (2006.01)
(Continued)

(52) U.S. Cl.
CPC ............... *G06T 5/002* (2013.01); *G06K 9/40* (2013.01); *G06K 9/4676* (2013.01);
(Continued)

(58) Field of Classification Search
CPC .. G06K 9/4676; G06K 9/6201; G06F 16/583; G06F 19/00; G06F 19/321
(Continued)

(56) References Cited

U.S. PATENT DOCUMENTS 9,836,481 B2 * 12/2017 Bhardwaj ............. G06F 16/583
2016/0217157 A1 * 7/2016 Shih ...................... G06F 16/5838

* cited by examiner

*Primary Examiner* — Charlotte M Baker
(74) *Attorney, Agent, or Firm* — SV Patent Service

(57) ABSTRACT

An image representation method and processing device based on local PCA whitening. A first mapping module maps words and characteristics to a high-dimension space. A principal component analysis module conducts principal component analysis in each corresponding word space, to obtain a projection matrix. A VLAD computation module computes a VLAD image representation vector; a second mapping module maps the VLAD image representation vector to the high-dimension space. A projection transformation module conducts projection transformation on the VLAD image representation vector obtained by means of projection. A normalization processing module conducts normalization on characteristics obtained by means of projection transformation, to obtain a final image representation vector. An obtained image representation vector is projected to a high-dimension space first, then projection transformation is conducted on a projection matrix computed in advance and vectors corresponding to words, to obtain a low-dimension vector; and in this way, the vectors corresponding to the words are consistent. The disclosed method and the processing device can obtain better robustness and higher performance.

10 Claims, 3 Drawing Sheets

(51) Int. Cl.
*G06T 7/33* (2017.01)
*G06T 7/37* (2017.01)
*G06K 9/40* (2006.01)
*G06K 9/62* (2006.01)

(52) U.S. Cl.
CPC ......... *G06K 9/6247* (2013.01); *G06K 9/6267* (2013.01); *G06T 7/33* (2017.01); *G06T 7/37* (2017.01)

(58) Field of Classification Search
USPC ....................................................... 382/190
See application file for complete search history.

| | SVLAD | HVLAD | VLAD+RPCAW | | | |
|---|---|---|---|---|---|---|
| Size | - | - | 32 | 64 | 128 | 256 |
| 64 | 58.09 | 60.50 | 59.71 | 62.51 | 64.28 | 59.74 |
| 128 | 61.12 | 62.72 | 61.13 | 64.3 | 65.24 | 62.59 |
| 256 | 61.68 | 63.08 | 63.34 | 65.58 | 66.93 | 63.88 |

| | SVLAD | HVLAD | VLAD+RPCAW | | | |
|---|---|---|---|---|---|---|
| Size | - | - | 32 | 64 | 128 | 256 |
| 64 | 3.34 | 3.45 | 3.41 | 3.46 | 3.50 | 3.38 |
| 128 | 3.38 | 3.49 | 3.46 | 3.51 | 3.52 | 3.43 |
| 256 | 3.43 | 3.52 | 3.5 | 3.54 | 3.54 | 3.49 |

IMAGE REPRESENTATION METHOD AND PROCESSING DEVICE BASED ON LOCAL PCA WHITENING

TECHNICAL FIELD

The present invention generally to image processing, and more specifically, to image representation methods based on regional Principle Component Analysis (PCA) whitening and processing devices thereof.

BACKGROUND OF THE INVENTION

Image representation is a very basic content in computer vision research. An abstract representation of an image is needed for image classification, image retrieval, or object recognition. Vector of locally aggregated descriptors (VLAD), a method of image representation, has been used in many studies at present.

In an original VLAD method, a vocabulary is created by K-means algorithm on a dataset first:

$$C=\{c_1,c_2,\ldots,c_k\},$$

where $c_k$ is a word in the vocabulary. For each image, a set of features corresponding to the image can be obtained firstly by using local features, usually SIFT (Scale-invariant feature transform):

$$I=\{x_1,x_2,\ldots,x_m\},$$

where $x_m$ is a feature in the set of features. Then a distance between each feature and the words in the vocabulary is calculated, and the feature is assigned to its nearest word. Finally, all the features corresponding to each word is calculated in the following way:

$$v_i = \sum_{x_j \in I: q(x)=c_i} x_j - c_i$$

where $q(x)=c_i$ denotes that the nearest word to the feature x is $c_i$, $v_i$ is a vector corresponding to the i-th word. The final VLAD representation is obtained by concatenating the vectors corresponding to all the words.

However, the redundancy between the features corresponding to the word, as well as de-noising, remains unsolved yet in the VLAD image representation method. The performance of VLAD also needs to be enhanced.

SUMMARY OF THE INVENTION

According to a first aspect of the present disclosure, an image representation method based on regional PCA whitening can include:

constructing a vocabulary, assigning each feature to a corresponding word and mapping words and features to a high dimensional space, the dimensions of the high dimensional space being higher than those of the current space of words and features;

conducting principal component analysis in each corresponding word space to obtain a projection matrix;

computing VLAD image representation vectors according to the vocabulary;

mapping the VLAD image representation vectors to the high dimensional space;

conducting projection transformation, according to the projection matrix, on VLAD image representation vectors obtained by means of projection; and normalizing features acquired by means of projection transformation to obtain final image representation vectors.

According to a second aspect of the present disclosure, an image representation processing device based on regional PCA whitening can include:

a first mapping module for constructing a vocabulary, assigning each feature to a corresponding word and mapping words and features to a high dimensional space, and the dimensions of the high dimensional space being higher than those of the current space of words and features;

a PCA module for conducting principal component analysis in each corresponding word space to obtain a projection matrix;

a VLAD computation module for computing VLAD image representation vectors according to the vocabulary;

a second mapping module for mapping the VLAD image representation vectors to the high dimensional space;

a projection transformation module for conducting projection transformation, according to the projection matrix, on VLAD image representation vectors obtained by means of projection; and a normalization processing module for normalizing features acquired by means of projection transformation to obtain final image representation vectors.

With the image representation method based on regional PCA whitening and processing device provided by the present disclosure, the first mapping module can construct a vocabulary, assign each feature to a corresponding word, and map words and features to a high dimensional space. The PCA module can conduct principal component analysis in each corresponding word space to obtain a projection matrix. The VLAD computation module can compute VLAD image representation vectors according to the vocabulary. The second mapping module can map the VLAD image representation vectors to the high dimensional space. The projection transformation module can conduct projection transformation, according to the projection matrix, on VLAD image representation vectors obtained by means of projection. The normalization processing module can normalize features acquired by means of projection transformation to obtain final image representation vectors. An obtained image representation vector is projected to a high-dimension space first, then projection transformation is conducted on a projection matrix computed in advance and vectors corresponding to words, so as to obtain a low-dimension vector; and in this way, the vectors corresponding to the words are consistent. The disclosed method and the processing device can obtain better robustness and higher performance.

DETAILED DESCRIPTION OF THE INVENTION

The present disclosure will be further described in detail below by some embodiments with reference to the accompanying drawings.

An image representation method and a processing device based on regional PCA whitening are provided in the present implementation example.

Figure 1:
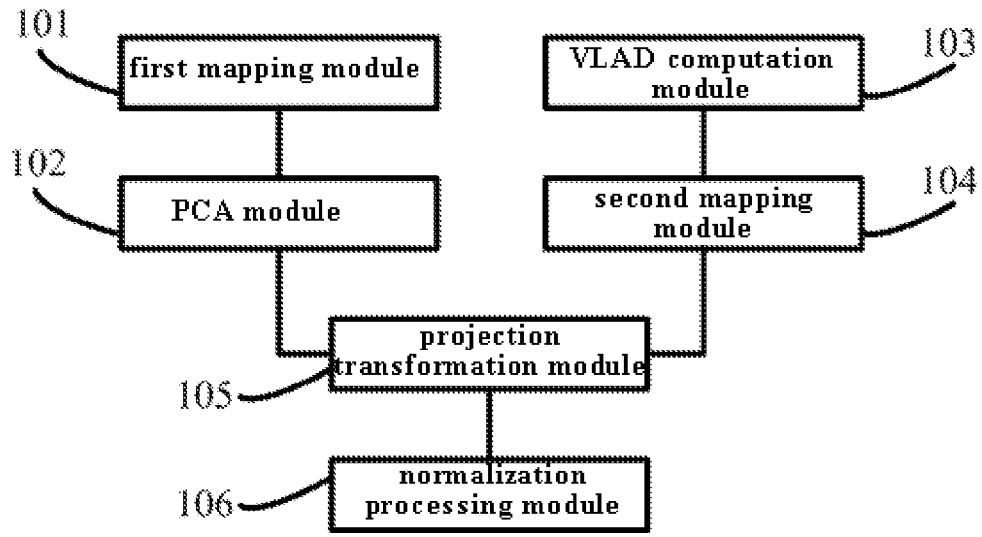
FIG. 1 is a schematic block diagram of an image representation processing device based on regional PCA whitening according to an embodiment of the present disclosure.

Referring to FIG. 1, an image representation processing device based on regional PCA whitening may include a first mapping module 101, a PCA module 102, a VLAD computation module 103, a second mapping module 104, a projection transformation module 105 and a normalization processing module 106.

The first mapping module 101 may be configured to construct a vocabulary, assign each feature to a corresponding word, and map words and features to a high dimensional space whose dimensions are higher than those of the current space of words and features.

The PCA module 102 may be configured to conduct principal component analysis in each corresponding word space to obtain a projection matrix.

The VLAD computation module 103 may be configured to compute VLAD image representation vectors based on the vocabulary.

The second mapping module 104 may be configured to map the VLAD image representation vectors to the high dimensional space.

The projection transformation module 105 may be configured to conduct projection transformation, according to the projection matrix, on the VLAD image representation vectors obtained by means of projection.

The normalization processing module 106 may be configured to conduct normalization on the features obtained by means of projection to obtain a final image representation vector.

In order to better illustrate the present disclosure, the present disclosure will be described below in combination with an image representation method based on local PCA whitening and a processing device thereof.

Figure 2:
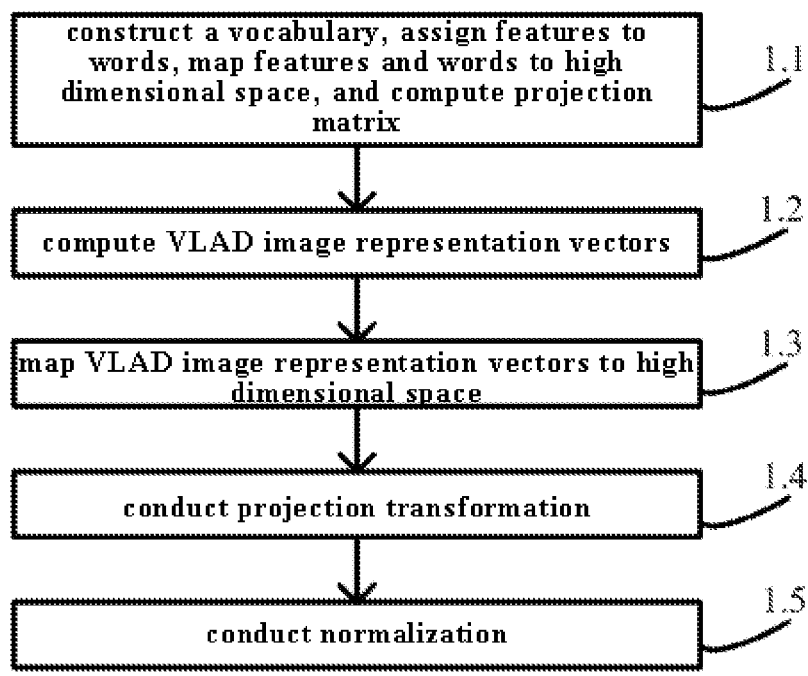
FIG. 2 is a schematic flow diagram of an image representation method based on regional PCA whitening according to an embodiment of the present disclosure.

Referring to FIG. 2, an image representation method based on regional PCA whitening may include steps as below:

Step 1.1: the first mapping module 101 may construct a vocabulary, assign each feature to a corresponding word, and map words and features to a high dimensional space whose dimensions are higher than those of the current space of words and features.

In this example, the vocabulary is generated by K-means algorithm, features used for each training is assigned to its nearest word (by distance), and words and features are explicitly mapped into a high dimensional space. Specifically, the dimensions may be three times higher than those of the current space of words and features.

In step 1.1, the PCA module 102 may conduct principal component analysis in each corresponding word space to obtain a projection matrix.

In this example, the projection matrix may be computed in the following way:

Computing a transition matrix $G_i$ with a formula below firstly, $$G_i = \frac{1}{D} \sum_{j=1, k=1} (x_j - c_i)(x_k - c_i)^T,$$

where $c_i$ is the i-the word, x is the features assigned to the word, D is feature dimensionality. When SIFT algorithm is selected for feature description, D is usually 128.

Performing eigen-decomposition on the matrix $G_i$ with formulas below to obtain the eigenvalues eigval($G_i$) and eigenvectors eigvect($G_i$) in descending order of eigenvalues.

$$(\lambda_1^i, \lambda_2^i, \ldots, \lambda_D^i) = \text{eigval}(G_i)$$

$$(u_1^i, u_2^i, \ldots, u_D^i) = \text{eigvect}(G_i)$$

Computing the projection matrix $P_t^i$ with a formula below, $$P_t^i = L_t^i U_t^i$$

where $$L_t^i = \text{diag}\left(\frac{1}{\lambda_1^i + \epsilon}, \frac{1}{\lambda_2^i + \epsilon}, \ldots, \frac{1}{\lambda_t^i + \epsilon}\right), \quad U_t^i = [u_1^i, u_2^i, \ldots, u_t^i]$$

ε and t are preset parameters, for example, ε=0.00001, t belongs to the feature dimensionality and can be adjusted according to actual situation.

Step 1.2: the VLAD computation module 103 may compute VLAD image representation vectors based on the vocabulary generated in step 1.1. In step 1.2, an original VLAD image representation vector x may be obtained by a VLAD image representation method in the prior art.

Step 1.3: the second mapping module 104 may map the VLAD image representation vectors to the high dimensional space. In this embodiment, the mapping is performed with a formula below:

$$\psi_\kappa(x) = e^{i\tau \log x} \sqrt{x \text{sech}(\pi\tau)},$$

where τ denotes the index of mapping. Specifically, the mapping method can be found in the following document: A. Vedaldi and A. Zisserman, "Efficient additive kernels via explicit feature maps," IEEE Trans. Pattern Anal. Mach. Intell., 2012.

In step 1.3, r may be the index of implicitly mapping. In step 1.1, the method mentioned in the above document can also be used when mapping the words and features into the high dimensional space, but an explicit mapping may be adopted.

Step 1.4: according to the obtained projection matrix, conducting projection transformation on the VLAD image representation vectors obtained in step 1.3.

In this implementation, the projection transformation is performed with a formula below to obtain feature y:

$$y = [P_t^1 x^1, P_t^2 x^2, \ldots, P_t^k x^k].$$

Step 1.5: conducting normalization on the features obtained by means of projection to obtain a final image representation vector. In this embodiment, second normal form (L2) normalization is performed on the projected feature y to obtain the final image representation vector.

The image representation method based on regional PCA whitening can be used for the task of image retrieval; that is, obtaining image representation of each image, performing similarity comparison between an image to be retrieval and each image in a database, and acquiring a retrieval result according to the similarity in descending order. The similarity is calculated as the cosine of the representation vectors between two images. It can be seen from FIG. 3, the feature distribution is disorderly and inconsistent in different word spaces generated by K-means clustering. Therefore, it is necessary to perform PCA whitening on each word space, namely, regional PCA whitening. In an embodiment of the present disclosure, better robustness may be obtained in the method and processing device by means of performing PCA on each corresponding word space to obtain projection matrix.

Figures 3, 4, 5:
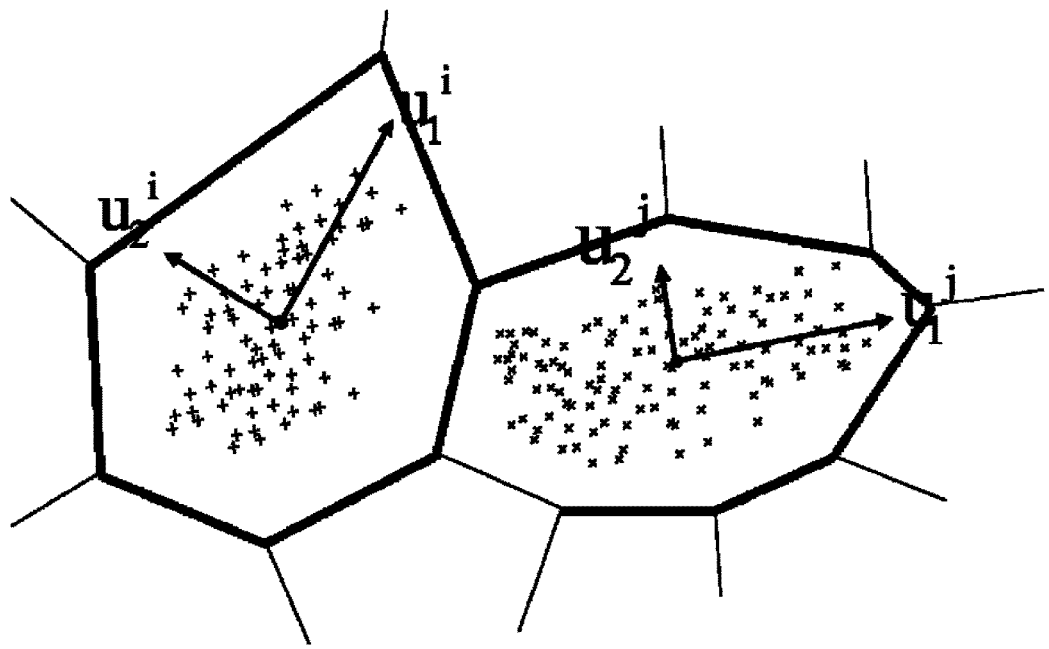
FIG. 3 is a schematic diagram of the feature distribution for different word spaces generated by K-means clustering.
FIG. 4 shows the comparison of different methods for different vocabulary sizes on Holidays dataset.
FIG. 5 shows the comparison of different methods for different vocabulary sizes on UKbench dataset.

Referring to FIG. 4 and FIG. 5, FIG. 4 is a comparison result of different methods for different vocabulary sizes on Holidays dataset, and FIG. 4 is a comparison result of different methods for different vocabulary sizes on UKbench dataset. In FIG. 4 and FIG. 5, the performances of different methods for different vocabulary sizes are compared (SVLAD represents standard VLAD, HVLAD represents VLAD mapped to high dimension, and VLAD+RPCAW is the method provided in the embodiment of the present disclosure); from which, the performance of the image representation method based on regional PCA whitening is better than that of other methods.

Figure 6:
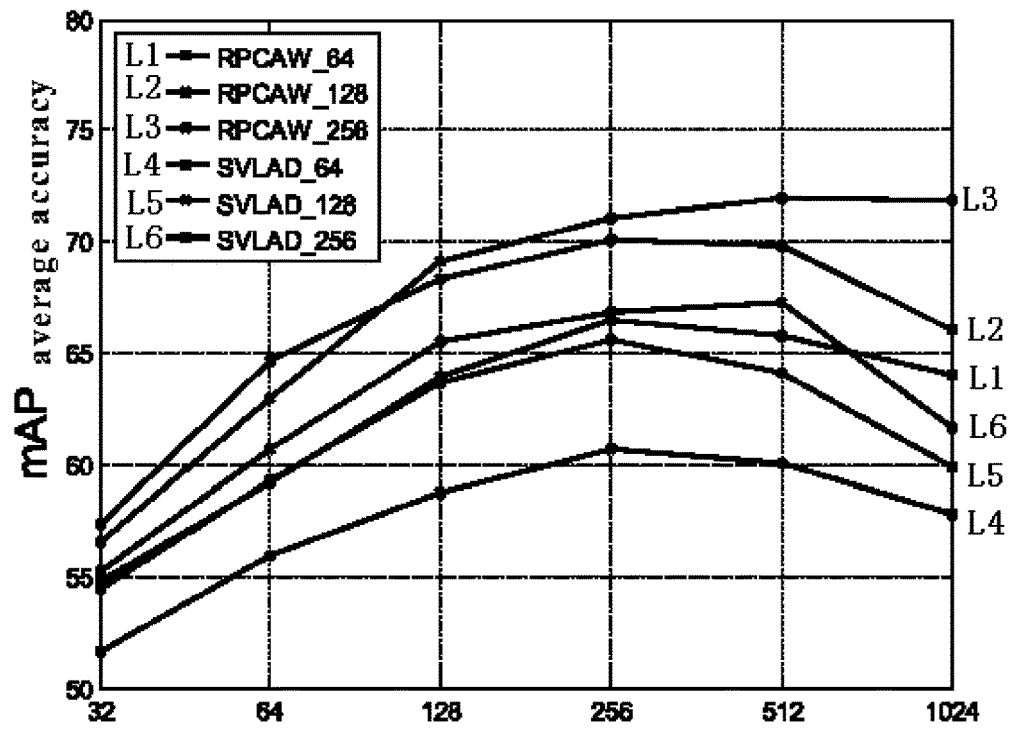
FIG. 6 shows the comparison of using and not using regional PCA whitening on Holidays dataset under different vocabulary sizes.
Figure 7:
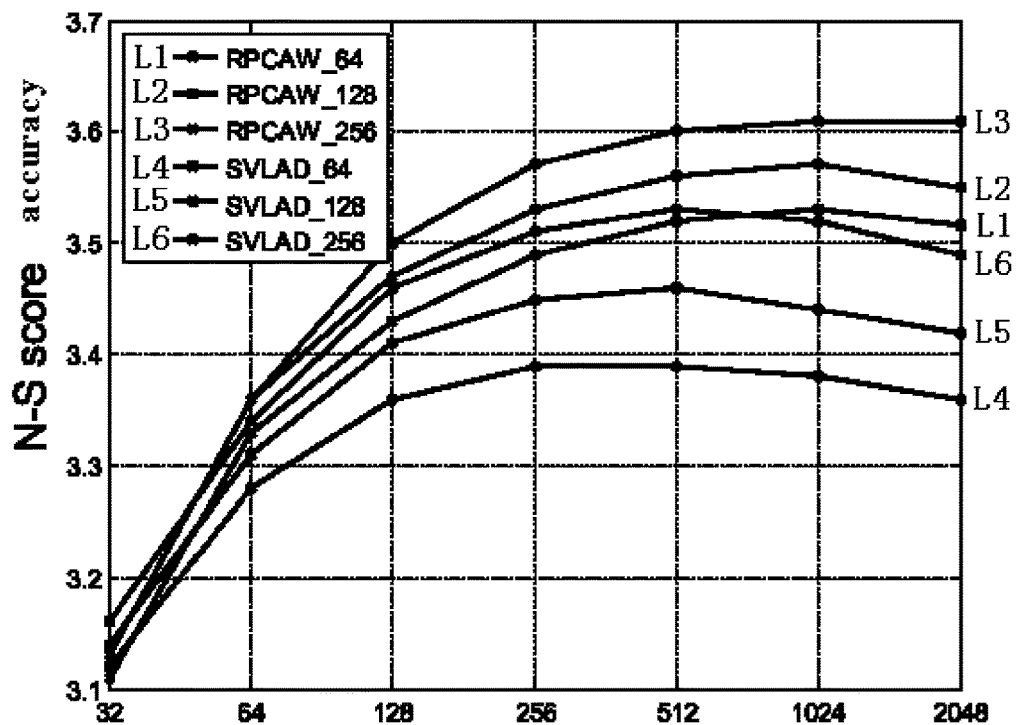
FIG. 7 shows the comparison of using and not using regional PCA whitening on UKbench dataset under different vocabulary sizes.

Referring to FIG. 6 and FIG. 7, FIG. 6 is a comparison result of using regional PCA whitening (RPCAW) and not using regional PCA whitening (SVLAD) under different vocabulary sizes on Holidays dataset, and FIG. 7 is a comparison result of using regional PCA whitening (RPCAW) and not using regional PCA whitening (SVLAD) under different vocabulary sizes on UKbench dataset. In FIG. 6 and FIG. 7, the performances of using regional PCA whitening and not using regional PCA whitening under different vocabulary sizes are compared; it can be seen that, the performance of the image representation method based on regional PCA whitening can further enhance the performance.

With the image representation method based on regional PCA whitening and processing device provided by the present disclosure, projection is conducted on an obtained image representation vector to a high dimensional space, projection transformation is performed on a projection matrix computed in advance and vectors corresponding to words, and a low-dimension vector is obtained. In this way, the vectors corresponding to the words are consistent. By means of the method and the processing device, better robustness and higher performance are obtained.

It can be understood by those skilled in the art that all or part of the steps of the various methods in the foregoing embodiments may be implemented by related hardware controlled by programs. The programs may be stored in a computer readable storage medium, which may include: a read only memory, Random access memory, magnetic disk or optical disk.

The foregoing is a further detailed description of the present disclosure in conjunction with specific embodiments, and it should not be considered that the specific embodiments of the present disclosure are limited to the aforesaid descriptions. For those skilled in the art, several simple deductions or replacements may be made without departing from the inventive concept of the present disclosure.

What is claimed is:

1. An image representation method based on regional PCA whitening, comprising:
    constructing a vocabulary, assigning each feature to a corresponding word and mapping words and features to a high dimensional space, wherein dimensions of the high dimensional space are higher than dimensions of the current space of words and features;
    conducting principal component analysis in each corresponding word space to obtain a projection matrix;
    computing VLAD image representation vectors according to the vocabulary;
    mapping the VLAD image representation vectors to the high dimensional space;
    conducting projection transformation, according to the projection matrix, on VLAD image representation vectors obtained by means of projection; and
    normalizing features acquired by means of projection transformation to obtain final image representation vectors.

2. The method according to claim 1, wherein the vocabulary is constructed by K-means algorithm and each feature is assigned to its nearest words, wherein the feature obtained by means of projection transformation is performed with second normal form normalization to obtain final image representation vectors.

3. The method according to claim 1, wherein the projection matrix may be obtained by conducting principal component analysis in each corresponding word space, which specifically includes:
    computing a transition matrix $G_i$ with a formula below $$G_i = \frac{1}{D} \sum_{j=1, k=1} (x_j - c_i)(x_k - c_i)^T,$$

where $c_i$ is the i-the word, x is the features assigned to the word, D is feature dimensionality;
performing eigen-decomposition on the matrix $G_i$ with formulas below so as to obtained the eigenvalues eigval($G_i$) and eigenvectors eigvect($G_i$); and $$(\lambda_1^i, \lambda_2^i, \ldots, \lambda_D^i) = \text{eigval}(G_i)$$

$$(u_1^i, u_2^i, \ldots, u_D^i) = \text{eigvect}(G_i)$$

computing the projection matrix $P_t^i$ with a formula below, $$P_t^i = L_t^i U_t^i$$

where $$L_t^i = \text{diag}\left(\frac{1}{\lambda_1^i + \epsilon}, \frac{1}{\lambda_2^i + \epsilon}, \ldots, \frac{1}{\lambda_t^i + \epsilon}\right), \quad U_t^i = [u_1^i, u_2^i, \ldots, u_t^i],$$

$\epsilon$ and t are preset parameters.

4. The method according to claim 3, wherein the VLAD image representation vectors are mapped to the high dimensional space with a formula below:

$$\psi_\kappa(x) = e^{i\tau \log x} \sqrt{x \text{sech}(\pi\tau)},$$

where $\tau$ denotes the index of mapping.

5. The method according to claim 3, wherein the step of conducting projection transformation, according to the projection matrix, on VLAD image representation vectors obtained by means of projection includes: conducting the projection transformation a formula below to obtain feature y, $$y=[P_t^1 x^1, P_t^2 x^2, \ldots, P_t^k x^k].$$

6. An image representation processing device based on regional PCA whitening, comprising:
a first mapping module configured to construct a vocabulary, assigning each feature to a corresponding word and mapping words and features to a high dimensional space, wherein dimensions of the high dimensional space are higher than dimensions of the current space of words and features;
a PCA module configured to conduct principal component analysis in each corresponding word space to obtain a projection matrix;
a VLAD computation module configured to compute VLAD image representation vectors according to the vocabulary;
a second mapping module configured to map the VLAD image representation vectors to the high dimensional space;
a projection transformation module configured to conduct projection transformation, according to the projection matrix, on VLAD image representation vectors obtained by means of projection; and
a normalization processing module configured to normalize features acquired by means of projection transformation to obtain final image representation vectors.

7. The processing device according to claim 6, wherein the first mapping module is configured to construct the vocabulary by K-means algorithm and assigning each feature to its nearest words, wherein the normalization processing module is configured to perform the feature obtained by means of projection transformation with second normal form normalization to obtain final image representation vectors.

8. The processing device according to claim 6, wherein when the PCA module conducts principal component analysis in each corresponding word space to obtain the projection matrix, the PCA module is configured to compute a transition matrix $G_i$ with a formula below $$G_i = \frac{1}{D} \sum_{j=1,k=1} (x_j - c_i)(x_k - c_i)^T$$

where $c_i$ is the i-the word, x is the features assigned to the word, D is feature dimensionality,
wherein the PCA module is further configured to perform eigen-decomposition on the matrix $G_i$ with formulas below so as to obtained the eigenvalues eigval($G_i$) and eigenvectors eigvect($G_i$), $$(\lambda_1^i, \lambda_2^i, \ldots, \lambda_D^i) = \text{eigval}(G_i)$$

$$(u_1^i, u_2^i, \ldots, u_D^i) = \text{eigvect}(G_i),$$

wherein the PCA module is further configured to computing the projection matrix $P_t^i$ with a formula below, $$P_t^i = L_t^i U_t^i$$

where $$L_t^i = \text{diag}\left(\frac{1}{\lambda_1^i + \epsilon}, \frac{1}{\lambda_2^i + \epsilon}, \ldots, \frac{1}{\lambda_t^i + \epsilon}\right), \quad U_t^i = [u_1^i, u_2^i, \ldots, u_t^i]$$

ε and t are preset parameters.

9. The processing device according to claim 8, wherein when the VLAD computation module computes the VLAD image representation vectors according to the vocabulary, the VLAD computation module is configured to perform mapping with a formula below:

$$\psi_\kappa(x) = e^{i\tau \log x} \sqrt{x \text{sech}(\pi\tau)},$$

where τ denotes the index of mapping.

10. The processing device according to claim 8, wherein the projection transformation module is configured to conduct projection transformation, according to the projection matrix, on VLAD image representation vectors obtained by means of projection the feature y is obtained by conducting the projection transformation a formula below, $$y=[P_t^1 x^1, P_t^2 x^2, \ldots, P_t^k x^k].$$

* * * * *